United States Patent
Nakagaki et al.

(10) Patent No.: US 9,935,310 B2
(45) Date of Patent: Apr. 3, 2018

(54) SILICON-CONTAINING MATERIAL AND SECONDARY-BATTERY ACTIVE MATERIAL INCLUDING SILICON-CONTAINING MATERIAL

(71) Applicant: KABUSHIKI KAISHA TOYOTA JIDOSHOKKI, Kariya-shi, Aichi (JP)

(72) Inventors: Yoshihiro Nakagaki, Kariya (JP); Nobuhiro Goda, Kariya (JP); Manabu Miyoshi, Kariya (JP); Yushi Kondo, Kariya (JP); Kensuke Yotsumoto, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 388 days.

(21) Appl. No.: 14/407,489

(22) PCT Filed: Jun. 25, 2013

(86) PCT No.: PCT/JP2013/003947
§ 371 (c)(1),
(2) Date: Dec. 12, 2014

(87) PCT Pub. No.: WO2014/002474
PCT Pub. Date: Jan. 3, 2014

(65) Prior Publication Data
US 2015/0147658 A1      May 28, 2015

(30) Foreign Application Priority Data
Jun. 27, 2012   (JP) .................................. 2012-144286

(51) Int. Cl.
*H01M 4/134* (2010.01)
*C01B 33/00* (2006.01)
(Continued)

(52) U.S. Cl.
CPC ............. *H01M 4/134* (2013.01); *C01B 33/00* (2013.01); *H01M 4/0447* (2013.01); *H01M 4/13* (2013.01);
(Continued)

(58) Field of Classification Search
CPC .... H01M 4/134; H01M 4/1395; H01M 4/386; C01B 33/00
See application file for complete search history.

(56) References Cited

U.S. PATENT DOCUMENTS 7,037,581 B2 *   5/2006   Aramata ................ B82Y 30/00
                                                      428/402
9,184,439 B2 *   11/2015  Miyoshi ................. C01B 33/24
(Continued)

FOREIGN PATENT DOCUMENTS

EP        1363341 A2      11/2003
JP      2005-263536 A       9/2005
(Continued)

OTHER PUBLICATIONS

International Search Report in PCT/JP2013/003947 dated Oct. 1, 2013.
(Continued)

*Primary Examiner* — Ula C Ruddock
*Assistant Examiner* — Thomas H. Parsons
(74) *Attorney, Agent, or Firm* — Sughrue Mion, PLLC

(57) ABSTRACT

Providing a silicon-containing material having a novel structure being distinct from the structure of conventional silicon oxide disproportionated to use.
A silicon-containing material according to the present invention includes at least the following: a continuous phase including silicon with Si—Si bond, and possessing a bubble-shaped skeleton being continuous three-dimensionally; and
(Continued)

a dispersion phase including silicon with Si—O bond, and involved in an area demarcated by said continuous phase to be in a dispersed state.

12 Claims, 5 Drawing Sheets

(51) Int. Cl.
    *H01M 4/485*     (2010.01)
    *H01M 4/38*     (2006.01)
    *H01M 4/1395*     (2010.01)
    *H01M 10/0525*     (2010.01)
    *H01M 4/04*     (2006.01)
    *H01M 4/13*     (2010.01)
    *H01M 4/139*     (2010.01)
    *H01M 10/052*     (2010.01)
    *H01M 4/02*     (2006.01)

(52) U.S. Cl.
    CPC ......... *H01M 4/139* (2013.01); *H01M 4/1395* (2013.01); *H01M 4/386* (2013.01); *H01M 4/485* (2013.01); *H01M 10/0525* (2013.01); *H01M 4/0459* (2013.01); *H01M 10/052* (2013.01); *H01M 2004/021* (2013.01); *H01M 2004/027* (2013.01); *H01M 2220/30* (2013.01)

(56) References Cited

U.S. PATENT DOCUMENTS

| | | | |
|---|---|---|---|
| 2006/0057463 A1* | 3/2006 | Gao | ........................ C01B 33/02 429/231.95 |
| 2006/0166098 A1 | 7/2006 | Tabuchi et al. | |
| 2008/0131694 A1 | 6/2008 | Sato et al. | |
| 2010/0261007 A1 | 10/2010 | Sato et al. | |
| 2012/0085974 A1 | 4/2012 | Kizaki | |
| 2012/0258370 A1 | 10/2012 | Miyoshi et al. | |

FOREIGN PATENT DOCUMENTS

| | | |
|---|---|---|
| JP | 2008-235083 A | 10/2008 |
| JP | 2010-170943 A | 8/2010 |
| WO | 2010/146759 A1 | 12/2010 |
| WO | 2011/077654 A1 | 6/2011 |
| WO | 2012014381 A1 | 2/2012 |
| WO | 2013125167 A1 | 8/2013 |

OTHER PUBLICATIONS

Communication dated Aug. 10, 2015 from the European Patent Office issued in corresponding application No. 13809342.2.

* cited by examiner

SILICON-CONTAINING MATERIAL AND SECONDARY-BATTERY ACTIVE MATERIAL INCLUDING SILICON-CONTAINING MATERIAL

CROSS REFERENCE TO RELATED APPLICATIONS

This is a National Stage of International Application No. PCT/JP2013/003947 filed Jun. 25, 2013, claiming priority based on Japanese Patent Application No. 2012-144286 filed Jun. 27, 2012, the contents of all of which are incorporated herein by reference in their entirety.

TECHNICAL FIELD

The present invention relates to a silicon-containing material being useful as a negative-electrode active-material ingredient for lithium-ion secondary battery, for instance.

BACKGROUND ART

Since a secondary battery, such as lithium-ion secondary batteries, has a small size and exhibits a large capacity, the secondary battery has been used in a wide variety of fields like cellular phones and notebook-size personal computers. Performance of a lithium-ion secondary battery is dependent on materials for the positive electrode, negative electrode and electrolyte constituting the secondary battery. Even among the materials, the research and development of active-material ingredients included in electrodes have been carried out actively. At present, carbon-based materials, such as graphite, are available as a negative-electrode active-material ingredient having been used commonly. Since a carbon negative electrode using graphite, and the like, as a negative-electrode active material, undergoes an intercalation reaction, the cyclability and output excel. Note, however, that no considerable upgrading in capacity is not expected from the carbon negative electrode from now on. In the meanwhile, a request for further upgrading lithium-ion secondary batteries in capacity has been intensifying as the lithium-ion secondary batteries' specifications and usages expand. Consequently, investigating negative-electrode active materials exhibiting a higher capacity, namely, a higher energy density, than carbon does, has been carried out.

As a negative-electrode active material being capable of materializing a high energy density, a silicon-based material, such as silicon or silicon oxide, is given. Silicon has a large lithium-ion sorbing (or occluding)/desorbing (or releasing) capacity per unit volume or per unit mass, and shows a high capacity being ten times or more of the capacity of carbon. However, although the silicon-based material has large charge and discharge capacities, the silicon-based material has a problem with the poor charge/discharge cyclability because of the following causes: the volumetric expansions at the time of sorbing lithium resulting in destructing electrodes; the pulverization of silicon leading to the downward sliding of the silicon off from electrodes; or the cut-off conductive paths resulting from the former two causes; and so on.

As a countermeasure for improving the charge/discharge cyclability of silicon, using a silicon oxide as a negative-electrode active material has been known. When a silicon oxide (e.g., $SiO_x$ where "x" falls in a range of $0.5 \leq "x" \leq 1.5$) is heat treated, the silicon oxide has been known to decompose into Si and $SiO_2$. The decomposition is called a disproportionation reaction. When the silicon oxide is SiO, homogenous solid silicon monoxide in which a ratio between Si and O is 1:1 roughly, internal reactions of the solid lead to separating the SiO into two phases, namely, an Si phase and an $SiO_2$ phase. Of the two phases, the micro-fine Si phase mainly carries out sorbing and desorbing lithium. The $SiO_2$ phase covers a plurality of the micro-fine Si phases, relieves the above-described volumetric expansion of the Si phases at the time of sorbing lithium, and furthermore possesses an action of inhibiting an electrolytic solution from decomposing. Therefore, a secondary battery, which uses a negative-electrode active material comprising SiO decomposed into an Si phase and an $SiO_2$ phase, excels in cyclability. Moreover, the $SiO_2$ phase has been known to form an Li—Si—O system compound at the initial charge to function as a lithium-ion conductor. However, since completely desorbing lithium sorbed in the Li—Si—O system compound at the time of discharging is difficult, the secondary battery is associated with such a problem that an irreversible capacity has arisen. In addition, in order for the Si phases inside an active material to sorb lithium therein and desorb lithium therefrom, the lithium is needed to diffuse within the $SiO_2$ phase covering the Si phases to pass through the $SiO_2$ phase. Therefore, another problem that the electric conductive property of the Li—Si—O system compound included in the $SiO_2$ phase rate-determines the diffusion rate of lithium in the interior of an active material arises.

Patent Application Publication No. 1 discloses negative-electrode active-material particles for lithium secondary battery, a negative-electrode active-material particles comprising a first phase composed of an alloy between silicon and a metallic element, and a second phase in which silicon makes the major element. The second phase is involved in the first phase having a three-dimensionally networked structure. Since the first phase composed of the alloy has a higher electron conductivity than the second phase does, the current-collecting property of the active-material particles is enhanced.

PATENT LITERATURE

Patent Application Publication No. 1: Japanese Unexamined Patent Publication (KOKAI) Gazette No. 2008-235083

SUMMARY OF THE INVENTION

Technical Problem

The active-material particles as set forth in Patent Application Publication No. 1 are graspable as a construction comprising an alloy phase (i.e., first phase), instead of an $SiO_2$ phase, when the active-material particles are compared with disproportionated conventional silicon oxide. However, including a metallic element leads to increasing the weight of electrode, and eventually to increasing the entire weight of battery. Therefore, the active-material particles are unsuitable for being employed in various vehicles and portable appliances. Moreover, the active-material particles are disadvantageous in terms of cost, because some elements among metallic elements are expensive.

In light of the above-mentioned problematic issues, an object of the present invention is to provide a silicon-containing material comprising a novel structure which is distinct from the structure of conventional silicon oxide disproportionated to use.

Solution to Problem

A silicon-containing material according to the present invention includes at least:
a continuous phase including silicon with Si—Si bond, and possessing a bubble-shaped skeleton being continuous three-dimensionally; and
a dispersion phase including silicon with Si—O bond, and involved in an area demarcated by said continuous phase to be in a dispersed state.

As described above, a conventional silicon oxide-based negative-electrode active material disproportionated to comprise an Si phase and an $SiO_2$ phase possesses a structure in which the Si phase is responsible for sorbing and desorbing lithium is covered with the $SiO_2$ phase, and in which Si particles are scattered about in the mother phase of $SiO_2$. In such a structure, although the $SiO_2$ phase sorbs lithium therein at the time of charging and then turns into Li—Si—O-system compounds to function as a lithium conductor, an irreversible capacity resulting from the formation of the Li—Si—O-system compounds arises as described above. Moreover, when the Si phase sorbs lithium therein and desorbs lithium therefrom, a problem which the conducting property of the Li—Si—O-system compounds included in the $SiO_2$ phase rate-determines the diffusion of lithium in the interior of active material occurs. Meanwhile, in the silicon-containing material according to the present invention, a phase including silicon with Si—Si bond exists successively and three-dimensionally as a continuous phase. Consequently, within the silicon-containing material according to the present invention, lithium is capable of diffusing and then passing through the interior of the continuous phase or an interfacial section between the continuous phase and the dispersion phase, when the lithium is sorbed in silicon and is desorbed therefrom. In short, the silicon-containing material according to the present invention has a route conveying lithium even down to the inside without subjecting the lithium to rate-determining by an oxygen-containing phase like the conventional $SiO_2$ phase.

Moreover, in the silicon-containing material according to the present invention, the dispersion phase including silicon with Si—O bond exists. However, in the silicon-containing material according to the present invention, since the continuous phase being able to sorb and desorb lithium exists, all of the dispersion phase does not necessarily need to turn into Li—Si—O-system compounds to keep forming a lithium electric conductor. Consequently, an irreversible capacity stemming from Li—Si—O-system compounds is inhibited from occurring.

Therefore, regardless of being a lightweight material of which major components are silicon and oxygen, the silicon-containing material according to the present invention comprises a structure in which the diffusion of lithium is likely to be carried out sufficiently so that an irreversible capacity is less likely to occur; and is suitable for an electrode material for secondary battery, such as lithium-ion secondary batteries.

Advantages of the Invention

Since the silicon-containing material according to the present invention comprises a novel structure which is distinct from the structure of disproportionated silicon oxide having been used heretofore conventionally, a battery employing the silicon-containing material according to the present invention as an active material for secondary battery has upgraded performance.

DETAILED DESCRIPTION OF THE PREFERRED EMBODIMENTS

Figure 1:
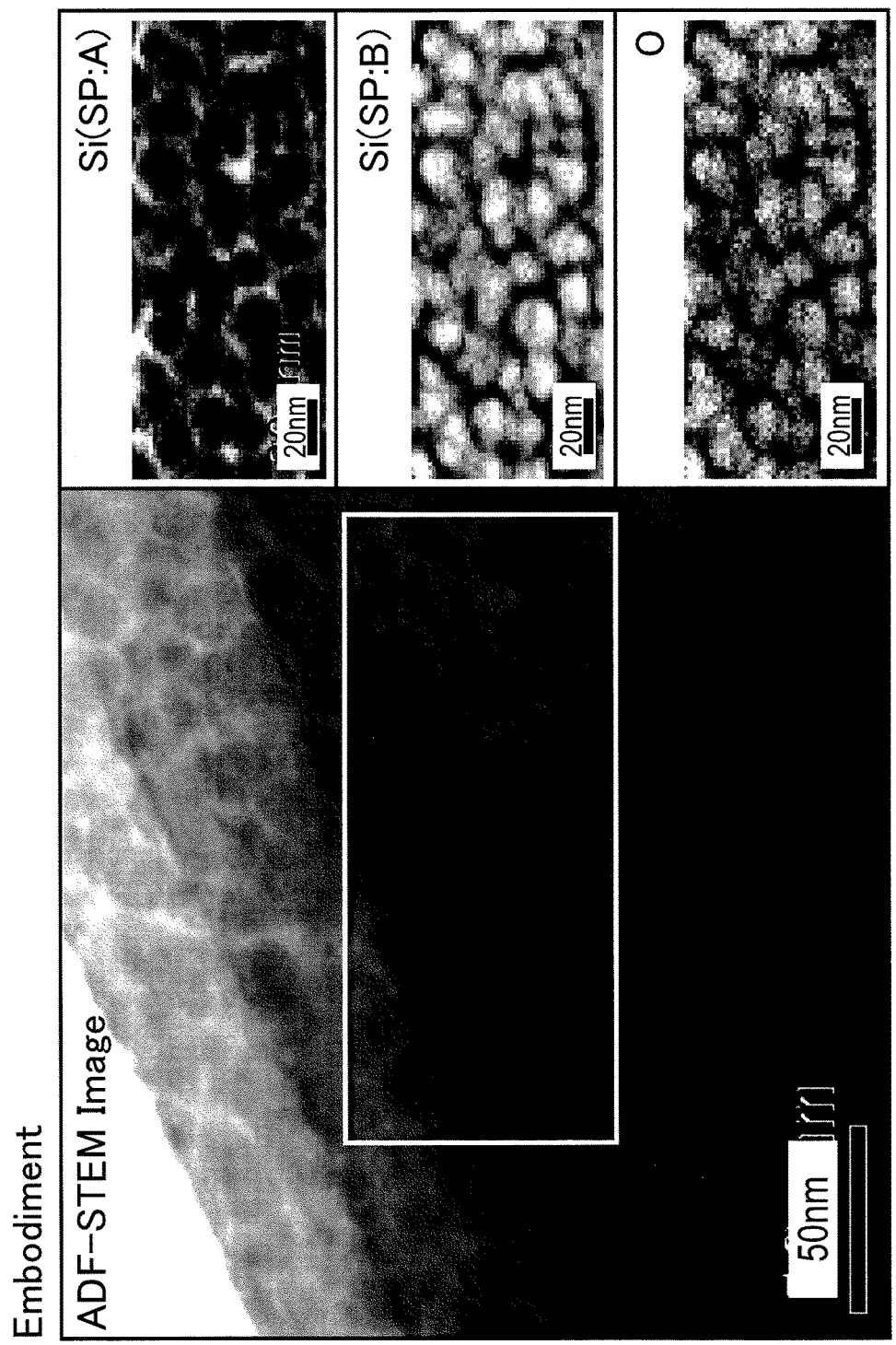
FIG. 1 is an image of a silicon-containing material according to the present invention taken by an annular dark-field scanning transmission electron microscope (i.e., an ADF-STEM image on the left diagram in the drawing), and includes electron energy-loss spectroscopic (or EELS) maps of an area surrounded with a frame on the ADF-STEM image (i.e., EELS maps on the top right, middle right and bottom right in the drawing), EELS maps which show an intensity distribution of silicon representing a spectral profile "A" illustrated in FIG. 2, another intensity distribution of silicon representing a spectral profile "B" illustrated in FIG. 2 and an intensity distribution of oxygen, respectively.

The following are descriptions on embodiments for executing the silicon-containing material according to the present invention. Note that, unless otherwise specified, ranges of numeric values, namely, "from 'a' to 'b'" set forth in the present description, involve the lower limit, "a," and the upper limit, "b," in the ranges. And, the other ranges of numeric values are composable by combining any of the two, which involve not only these upper-limit values and lower-limit values but also numeric values enumerated in embodiments specified below.

Silicon-Containing Material According to Present Invention

A silicon-containing material according to the present invention includes at least a continuous phase including silicon with Si—Si bond, and a dispersion phase including silicon with Si—O bond. The respective phases are described hereinafter.

The continuous phase preferably has silicon as a major component, and is mainly responsible for sorbing and desorbing lithium, and the like, when the silicon-containing material according to the present invention is used as a secondary-battery material. The continuous phase possesses a bubble-shaped skeleton being continuous three-dimensionally. The state which a bubble-shaped skeleton is continuous three-dimensionally is observable by electron-beam tomography using a transmission electron microscope (being sometimes called "3D-TEM"), for instance. Moreover, although the observation is done in planar manner, the structure of the continuous phase is ascertainable even from a transmission-electron-microscope image which is obtainable by observing a sample made by cutting a silicon-containing material as a thin flaky shape.

The dispersion phase preferably has oxygen and silicon as major components. The dispersion phase is involved in an area demarcated by the continuous phase to be in a dispersed state. That is, the dispersion phase is preferably composed of a plurality of fine particles. The fine particles are preferably retained in an area demarcated by the continuous phase to exist. An allowable average particle diameter of the fine particles is from 0.05 to 50 nm, or from 0.05 to 30 nm, or furthermore from 0.05 to 20 nm.

The fine particles are preferably retained in the continuous phase in a state of being buried in the bubble-shaped skeleton. Consequently, an average particle diameter of the fine particles coincides with an average particle of an area in which the fine particles are retained in the continuous phase. From the viewpoint of relieving volumetric changes occurring in the continuous phase when the continuous phase sorbs and desorbs lithium, and the like, the continuous phase desirably has a bubble-shaped skeleton of which meshes are finer, that is, the fine particles which the continuous phase retains are micro-finer desirably. Moreover, from the viewpoint of relieving the volumetric changes occurring in the continuous phase, a thickness of the continuous phase separating between the neighboring fine particles is also thinner desirably. An allowable thickness of the continuous phase is 10 nm or less, or a more allowable thickness thereof is from 0.05 to 5 nm. Although a preferable continuous phase covers the fine particles on the surface so that the continuous phase retains the neighboring fine particles one by one independently, a permissible continuous phase even has parts where the fine particles neighbor mutually one another directly.

Note that an "average particle" refers to an averaged value of the maximum diameters of the fine particles measured from an image, such as a transmission-electron-microscope image or chemical-state mapping. For example, the "maximum diameters of the fine particles" refer to the maximum values of intervals between two parallel lines when the fine particles are held between the parallel lines. Moreover, a "thickness of the continuous phase" also refers to an averaged value of the thickness values measured directly from the image.

Silicon and oxygen included in the continuous phase and dispersion phase are ascertainable by a mapping analysis using a publicly-known electron-beam analyzing technique. For example, an energy dispersive X-ray analysis (or EDX) is given as a technique being able to do an elemental analysis, and an electron energy-loss spectroscopic analysis (or EELS), or the like, is given as a technique being able to do an elemental analysis and chemical-state analysis. In particular, using TEM-EELS, in which a transmission electron microscope (or TEM) and an electron energy-loss spectroscopic (or EELS) detector are combined with each other, is very desirable. In the TEM-EELS, the type and chemical state of elements included in any locations irradiated with an electron beam are examinable. Any nanometer-size areas are irradiated with an electron beam by converging the electron beam into a fine beam using a function of the TEM. Consequently, as to the respective areas of interest in the continuous phase and dispersion phase, examining the type and chemical state of elements included therein becomes feasible. In the silicon-containing material according to the present invention, EELS spectra differing between the continuous phase and the dispersion phase are detected. Moreover, in the TEM-EELS, a mapping-mode is measurable by scanning with finely-converged electron beam. From elemental mapping or chemical-state mapping (or EELS map) of silicon and oxygen acquired by the TEM-EELS, the continuous phase including silicon as a major component, and the dispersion phase including silicon and oxygen as major components are ascertainable as a spatial concentration distribution, respectively.

In an EELS spectrum of silicon's $L_{2,3}$ loss near edge measured instrumentally by an electron energy-loss spectroscopic method, the continuous phase preferably has abroad spectral profile and exhibits 100 eV or less by loss energy in a rise at the loss edge. That is, a broad spectrum derived from an Si—Si bond is obtainable from the continuous phase. Therefore, the presence of the continuous phase is observed as a networked shape in a chemical state map being obtainable by extracting an electron-beam intensity, which is derived from the Si—Si bond, from out of electron-beam intensities at around the 100-eV loss energy, namely, an energy arising from an excited electron in the L shell of silicon.

On the other hand, the following spectrum is preferably observed from the dispersion phase: a spectrum having a loss edge shifted to a higher energy side, exhibiting a definite peak, and derived from silicon with a chemical state differing from the chemical state of the silicon in the continuous phase. That is, a spectrum derived from an Si—O bond is obtainable from the dispersion phase. Therefore, the presence of the dispersion phase is observed as fine particulate shapes involved in a meshed network in a chemical state map being obtainable by extracting an electron-beam intensity, which is derived from the Si—O bond, from out of electron-beam intensities at around the 100-eV loss energy, namely, an energy arising from an excited electron in the L shell of silicon.

Moreover, the presence of the dispersion phase is preferably observed as fine particulate shapes involved in a meshed network in another chemical state map being obtainable by using an electron beam equivalent to a loss energy at around 530 eV, namely, an energy arising from an excited electron in the K shell of oxygen.

In the silicon-containing material according to the present invention, the continuous phase includes silicon with Si—Si bond. In addition to elementary-substance silicon, allowable silicon included in the continuous phase is also silicon in a silicon-based compound, such as an Si—Li compound, which sorbs lithium to make a part of or all of the continuous phase. Moreover, the dispersion phase includes silicon with Si—O bond. That is, a preferable dispersion phase includes a silicon oxide-based compound. A permissible silicon oxide-based compound includes one or more members selected from the group consisting of Si—O compounds and Li—Si—O compounds. As for the Si—O compounds, silicon oxides, such as $SiO_2$ and $SiO_x$ (where "x" falls in a range of 0.5≤"x"≤1.5), are given. An allowable Si—O compound includes one or more members of the silicon oxides. As for the Li—Si—O compounds, $Li_2SiO_3$, $Li_4SiO_4$, $Li_2Si_2O_5$, $Li_6Si_2O_7$, $Li_2Si_3O_7$, $Li_8SiO_6$, and so forth, are given. A permissible Li—Si—O compound includes one or more members of the lithium-containing silicon oxides.

The silicon-containing material according to present invention preferably has a powdery shape, or more preferably includes silicon-containing particles including the continuous phase and dispersion phase. The powder-shaped silicon-containing material is useful as an active material for secondary battery. Since the silicon-containing material according to the present invention comprises the continuous phase of which major component is silicon, the present silicon-containing material has a high conductivity for lithium, and the like. Accordingly, even when the silicon-containing particles have a size being large to a certain extent, lithium, and so forth, are inferred to be movable even down to the central section of the particles. Therefore, although the particle diameter of the silicon-containing particles is not limited especially, a preferable particle diameter is from 0.001 to 30 µm, or a more preferable particle diameter is from 0.05 to 20 µm, on average.

The above-described structure being characteristic to the silicon-containing material according to the present invention has been ascertained in a discharged state at least. In short, the structure has been ascertained in a state where electrolytic ions, such as lithium ions, are desorbed from the present silicon-containing material.

Negative Electrode for Secondary Battery

The silicon-containing material according to the present is suitable for an active material for various secondary batteries, and is especially suitable as a negative-electrode active material therefor. A negative electrode comprises a current collector, and a negative-electrode active-material layer including a negative-electrode active material and bound on the current collector. The negative-electrode active-material layer includes the negative-electrode active material and a binder resin, as well as a conductive additive, if needed.

Although an adoptable current collector is made of a metal, and has such a configuration as a mesh, foil or plate, the configuration is not limited at all especially as far as the configuration is in compliance with objectives. As the current collector, a copper foil or aluminum foil is used suitably, for instance.

Note that an acceptable negative-electrode active-material layer includes the aforementioned silicon-containing material according to the present invention as an indispensable active material, and further includes another negative-electrode active material, too. As to the other negative-electrode active material, no limitations are made at all especially, as far as the other negative-electrode active material is an elementary substance, alloy or compound being able to sorb and desorb electrolytic ions therein and therefrom. For example, a negative-electrode material being given herein includes lithium, or at least one member selected from the group consisting of Na, K, Rb, Cs, Fr, Be, Mg, Ca, Sr, Ba, Ra, Ti, Ag, Zn, Cd, Al, Ga, In, Ge, Sn, Pb, Sb and Bi, namely, elements being able to undergo an alloying reaction with lithium. To be concrete, the following are given: tin-based materials, such as Cu—Sn alloys and Co—Sn alloys; carbon-based materials, such as various types of graphite; and silicon-based materials having been used heretofore conventionally, such as $SiO_x$ (where $0.5 \leq$"x"$\leq 1.5$). Along with the silicon-containing material according to the present invention, one or more members selected from the group consisting of the above tin-based materials, carbon-based materials and silicon-based materials are employable.

The conductive additive is added in order to enhance the conductive property of an electrode. As the conductive additive, using materials, which have been used commonly in the electrodes of lithium-ion secondary batteries, is allowable. For example, using one of the following conductive carbon materials is preferable; carbon blacks (or carbonaceous fine particles), such as graphite, acetylene black and KETJENBLACK; and carbon fibers. In addition to the conductive carbon materials, using a well-known conductive additive, such as conductive organic compounds and Ni flakes, is also permissible. Using a member of the above commonly-used materials and well-known conductive additives independently, or admixing two or more members thereof to use, is even allowable. Although an employment amount of the conductive additive is not restrictive at all especially, the employment amount is set at from 20 to 100 parts by mass approximately to 100-part-by-mass active material, for instance. When the amount of the conductive additive is less than 20 parts by mass, no efficient conductive paths are formed; whereas not only the formability of an electrode worsens but also the resulting energy density lowers when the amount of the conductive additive exceeds 100 parts by mass. Note that, when silicon-containing particles possessing a coated layer composed of a carbon material are used, an addition amount of the conductive additive is reduced. Alternatively, not adding any conductive additive is also permissible.

The binder resin is used as a binding agent for binding the active material and conductive material together onto the current collector. The binder resin is required to bind the active material, and so on, together in an amount as less as possible. A desirable amount of the binder resin is from 0.5 to 50% by mass when the negative-electrode active material, the conductive additive and the binder resin are taken as 100% by mass in total. When the amount of the binder resin is less than 0.5% by mass, the formability of an electrode declines; whereas the energy density of an electrode lowers when the amount of the binder resin exceeds 50% by mass. Note that, as for the binder resin, the following are exemplified: fluorine-based polymers, such as polyvinylidene fluoride (or PVDF) and polytetrafluoroethylene (or PTFE); rubbers, such as styrene-butadiene rubbers (or SBR); imide-based polymers, such as polyimides; polyamide-imides; alkoxysilyl group-containing resins; polyacrylates; polymethacrylates; polyitaconates; alginic acid; gelatin; and so forth. Moreover, a copolymerized substance of acrylic acid with acid monomer, such as methacrylic acid, itaconic acid, fumaric acid or maleic acid, is also usable. Even among the above resins, a resin containing a carboxylic group, such as a polyacrylate, is especially desirable. Moreover, employing an organic/inorganic composite material, which is represented by a polyamide-imide resin/silica hybrid, is also allowable. As for an organic component of the organic/inorganic composite material, including one of the above-mentioned resins is permissible.

The negative-electrode active-material layer is usually fabricated by the following steps: mixing the negative-electrode active material and the binder resin one another; adding the conductive additive and a proper amount of an organic solvent, if needed, to the resulting mixture to turn the mixture into a slurry; coating the resultant slurry onto the current collector by such a method as roll-coating method, a dip-coating method, a doctor-blade method, a spray-coating method or a curtain-coating method; and then curing the binder resin.

However, the silicon-containing material according to the present invention is produced by having silicon oxide, one of the raw materials, sorb and desorb electrolytic ions therein and therefrom, as described later. Consequently, preparing a slurry including silicon oxide, one of the raw materials, instead of the silicon-containing material according to the present invention, to form the negative-electrode active-material layer is also allowable. The negative electrode is obtainable by using a negative electrode including silicon oxide, one of the raw materials, and then having the silicon oxide sorb and desorb electrolytic ions therein and therefrom under later-described conditions.

Secondary Battery

A secondary battery according to the present invention comprising the above-mentioned negative electrode further comprises a publicly-known positive electrode, electrolytic solution and separator which are not limited at all especially, along with said negative electrode. An allowable positive electrode is a positive electrode which is employable in a secondary battery, such as a lithium-ion secondary battery, and the like. The positive electrode comprises a current collector, and a positive-electrode active-material layer including a positive-electrode active material and bounded on the current collector. The positive-electrode active-material layer includes a positive-electrode active material, and a binder resin; but further including a conductive additive is also permissible. The positive-electrode active material, conductive additive and binder resin are not limited at all especially, so that a positive-electrode active material, conductive additive and binder resin, which are employable in a secondary battery, are acceptable.

As for the positive-electrode active material, the following are given; lithium-containing metallic oxides, of which fundamental composition is $LiCoO_2$, $LiNi_pCo_qMn_rO_2$ (where $0<\text{"p"}<1$; $0+\text{"p"}<\text{"q"}<1-\text{"p"}$; $0+(\text{"p"}+\text{"q"})<\text{"r"}<1-(\text{"p"}+\text{"q"}))$, $Li_2MnO_2$, $Li_2MnO_3$, $LiNi_sMn_tO_2$ (where $0<\text{"s"}<1$; and $0+\text{"s"}<\text{"t"}<1-\text{"s"}$), $LiFePO_4$, and $Li_2FeSO_4$, respectively; or solid-solution materials, which include one member or two or more members of the respective lithium-containing metallic oxides. Moreover, as the positive-electrode active material, the following active materials, which are free from any element, such as lithium, making electrolytic ions in charging and discharging operations, are also usable: sulfur elementary substances (S); sulfur-modified compounds in which S has been introduced into organic compounds, such as polyacrylonitrile (or PAN); metallic sulfide, such as $TiS_2$; polyanilines; conjugated diaceate-based organic substances; for instance. In the case of the latter active materials free from any element making electrolytic ions, the positive electrode, the negative electrode or both of the two need to be added with electrolytic ions in advance by a publicly-known method.

Although an adoptable current collector is made of a metal and has such a configuration as a mesh, foil or plate, the configuration is not limited at all especially as far as the configuration is in compliance with objectives. An acceptable current collector is made of a material, such as aluminum, nickel or a stainless steel, which has been employed commonly in a positive electrode for secondary battery. An employable binder resin and conductive additive are the same as the binder resins and conductive additives as set forth in the above-mentioned negative electrode.

Note that acceptable blending proportions of the positive-electrode active material, binding agent and conductive additive are set up following the blending proportions which have been set up for conventional secondary batteries.

The positive-electrode active-material layer is usually fabricated by the following steps: mixing the positive-electrode active material and the binder resin one another; adding the conductive additive and a proper amount of an organic solvent, if needed, to the resulting mixture to turn the mixture into a slurry; coating the resultant slurry onto the current collector by such a method as roll-coating method, a dip-coating method, a doctor-blade method, a spray-coating method or a curtain-coating method; and then curing the binder resin. Note that, when being a sheet-shaped sulfur-modified organic compound, press attaching the sheet-shaped sulfur-modified organic compound, per se, onto the current collector as the positive-electrode active-material layer is also acceptable.

For an electrolytic solution, using a nonaqueous-system electrolytic solution in which a lithium metallic salt, an electrolyte, has been dissolved in an organic solvent is allowable. As the organic solvent, at least one member selected from the group consisting of nonprotonic organic solvents, such as propylene carbonate (or PC), ethylene carbonate (or EC), dimethyl carbonate (or DMC), diethyl carbonate (or DEC), and ethyl methyl carbonate (or EMC), for instance, is usable. Moreover, as for the electrolyte to be dissolved in the organic solvent, an alkali metal salt being soluble in the organic solvent, such as $LiPF_6$, $LiBF_4$, $LiAsF_6$, $LiI$, $NaPF_6$, $NaBF_4$, $NaAsF_6$ or LiBOB, is usable. A permissible concentration of the electrolyte is from 0.5 to 1.7 mol/L approximately.

A separator is further arranged between the positive electrode and the negative electrode, thereby not only permitting movements of electrolytic ions between the positive electrode and the negative electrode but also preventing the positive electrode and negative electrode from short-circuiting internally. When the present secondary battery is an enclosed type, the separator is also required to have a function of retaining the electrolytic solution therein. As for the separator, using a thin-walled and microporous or non-woven fabric-like membrane, which is made of polyethylene, polypropylene, PAN, aramid, polyimide, cellulose, or glass, and so on, is preferable.

A configuration of the present secondary battery is not limited at all especially, so that various sorts of configurations, such as cylindrical types, laminated types and coin types, are employable. Even when any one of the configurations is adopted, the separators are interposed between the positive electrodes and the negative electrodes to make electrode assemblies. Then, after connecting intervals from the positive-electrode current collectors and negative-electrode current collectors up to the respective positive-electrode terminals and negative-electrode terminals, which lead to the outside, with leads for collecting electricity, the electrode assemblies are sealed hermetically in a battery case along with the electrolytic solution, thereby turning the constituent members into a battery.

The above-described present secondary battery is utilizable suitably in the field of automobiles, in addition to the fields of communication devices or information-related devices, such cellular phones and personal computers. For example, when a vehicle has the present secondary battery on-board, the present secondary battery is employable as a power source for electric automobile.

Production of Silicon-Containing Material

Although the following show an example of a production process for the silicon-containing material according to the present invention, the production is not limited to the technique described below.

Using silicon monoxide (e.g., $SiO_x$ (where "x" falls in a range of $0.5 \leq \text{"x"} \leq 1.5$)) as a raw material makes fabricating the silicon-containing material according to the present invention possible. A preferable $SiO_x$ employed as a raw material has a powdery shape. Moreover, a more preferable $SiO_x$ is a powder of which particle diameter is from 0.001 to 30 μm, or furthermore from 0.05 to 20 g m, on average. Employing $SiO_x$, which has been separated by a disproportionation treatment in advance into two phases, i.e., an $SiO_2$ phase and an Si phase, is acceptable.

In silicon monoxide (e.g., $SiO_x$ (where "x" falls in a range of 0.5≤"x"≤1.5)), a homogeneous solid in which an atomic ratio between Si and O is 1:1 roughly, $SiO_x$ disproportionates into two phases, an $SiO_2$ phase and an Si phase, by reactions inside the solid. A disproportionated silicon monoxide powder includes an $SiO_2$ phase, and an Si phase. The disproportionation proceeds by giving energy to the $SiO_x$. As for an energy-giving means, giving thermal energy to the $SiO_x$, giving mechanical energy thereto, for example, by milling, and so on, are named.

When giving thermal energy to the $SiO_x$, heating the $SiO_x$ is acceptable. Almost all of silicon monoxide is said in general to disproportionate to separate into the two phases at 800° C. or more under such circumstances where oxygen is cut off. To be concrete, a powder, which includes two phases with a non-crystalline $SiO_2$ phase and a crystalline Si phase, is obtainable by carrying out a heat treatment to a raw-material powder including a non-crystalline silicon monoxide powder at from 800° C. to 1,200° C. within an inert atmosphere, such as within a vacuum or within an inert gas, for from one hour to five hours.

When silicon monoxide is subjected to milling, some of mechanical energy in milling contributes to chemical atomic diffusions at the solid-phase interface of the silicon monoxide, thereby generating the oxide phase and the silicon phase. Carrying out the milling within an inert atmosphere, such as within a vacuum or within an inert gas, is allowable. Employing a type-V mixer, a ball mill, an attritor, a jet mill, a vibrational mill or a high-energy ball mill, and the like, is feasible. Further facilitating the disproportionation of silicon monoxide is also permissible by further heating the silicon monoxide during the milling of the silicon monoxide, or after the milling.

The silicon-containing material according to the present invention comprising the above-described novel structure is obtainable by carrying out sorbing and desorbing of cation to the disproportionated silicon monoxide powder under specific conditions. Therefore, doing the following one after another is allowable: fabricating an electrode including the disproportionated silicon monoxide powder by a publicly-known method; assembling a battery with the resulting electrode along with a counter electrode; and then carrying out sorbing and desorbing of cation to the disproportionated silicon monoxide powder, that is, charging and discharging the resultant battery. As a manufacturing process for the electrode including the disproportionated silicon monoxide powder, using the above-described negative-electrode manufacturing process is permissible. As to a construction of the battery, too, having the above-described secondary-battery construction is allowable, but making the counter electrode of metallic lithium is also permissible.

Note that there arises such a case that an initial charging/discharging operation is carried out even to a common secondary battery using a silicon-based negative-electrode active material in the initial state before use. The initial charging/discharging operation has been called a conditioning treatment. In the initial conditioning treatment, carrying out the charging/discharging operation to the initial-state secondary battery results in forming a coated film on a surface of the silicon-based negative-electrode active material in the negative electrode constituting the secondary battery, so that covered particles, which comprise: a core composed of the silicon-based negative-electrode active material; and a coated film covering the core, are formed. After subjecting disproportionated silicon monoxide to such a conditioning treatment, further carrying out a charging/discharging operation for obtaining the silicon-containing material according to the present invention is also acceptable.

In order to obtain the silicon-containing material according to the present invention by carrying out the sorbing and desorbing of cation to the disproportionated silicon monoxide powder, carrying out a charging/discharging operation at a higher temperature or with a higher rate than the temperature or rate under which the conditioning treatment has been heretofore carried out conventionally, or under both of the two higher conditions, is allowable. To be concrete, the charging/discharging operation is desirably carried out in such a state where the entire battery is retained at such a high temperature as 35° C. or more, 40° C. or more, or furthermore 50° C. or more. Since exceeding 80° C. leads sometimes to denaturing the electrolytic solution's component, especially, the solvent, a desirable temperature is 80° C. or less, 70° C. or less, or furthermore 60° C. or less. Moreover, an amount of current, only by which the full capacity of a secondary battery is discharged for one hour, is referred to as a "1C" rate, so that a "C rate" expresses how much the amount of current is multiplied. The silicon-containing material according to the present invention is obtainable by carrying out a charging/discharging operation with such a high rate as 1C or more, or furthermore 1.5C or more. Since going beyond 5C leads sometimes to making lithium likely to precipitate onto a surface of the negative electrode so that the capacity declines, a desirable rate is 4C or less, or furthermore 2.5C or less. Although a voltage range depends on a material employed for the counter electrode, setting a discharge cut-off voltage at from 3.6 to 4.0 V, or furthermore from 3.7 to 4.0 V; and setting a charge cut-off voltage at from 4.0 to 4.2V, or furthermore from 4.1 to 4.2V, are permissible, when the counter electrode is made of a lithium-manganese-system oxide-based positive-electrode material having such a layered rock-salt structure as $LiNi_{1/3}CO_{1/3}Mn_{1/3}O_2$ does. In other words, carrying out a charging/discharging operation in such a high voltage range as from 3.6 to 4.2 V, from 3.7 to 4.2 V, or furthermore from 3.9 to 4.2 V, is desirable. The charging/discharging operation is carried out with a constant current or at a constant voltage, or under both of the two conditions. Selecting a voltage value at the time of a constant voltage from within the above-mentioned ranges is allowable. Carrying out the charging/discharging operation repeatedly two cycles or more, five cycles or more, or furthermore 10 cycles or more, is permissible, but carrying out the charging/discharging operation repeatedly from 10 to 20 cycles is suitable.

Note that, although the above-mentioned conditioning treatment is not indispensable at all, the conditioning treatment is carried out allowably under such conditions as a common conditioning treatment has been done. To be concrete, a desirable treatment temperature is room temperature (i.e., 25° C.), or carrying out the conditioning treatment at from 15 to 35° C., or furthermore from 20 to 30° C., is permissible. Moreover, carrying out the conditioning treatment with such a rate as from 0.1 to 1.5C, or furthermore from 0.1 to 1C, is acceptable. Although a voltage range depends on a material employed for the counter electrode, setting a discharge cut-off voltage at from 2.5 to 3.5 V, or furthermore from 2.9 to 3.1 V; and setting a charge cut-off voltage at from 3.8 to 4.2 V, or furthermore from 4.0 to 4.2 V, are allowable, when the counter electrode is made of a lithium-manganese-system oxide-based positive-electrode material having such a layered rock-salt structure as $LiNi_{1/3}Co_{1/3}Mn_{1/3}O_2$ does. In other words, carrying out a charging/discharging operation in such a voltage range as from 2.5 to 4.2 V, or furthermore from 2.9 to 4.2V, is desirable. The charging/discharging operation is carried out with a constant current or at a constant voltage, or under both of the two conditions. Selecting a voltage value at the time of a constant voltage from within the above-mentioned ranges is permissible. Carrying out the charging/discharging operation repeatedly one cycle or more, from two to five cycles, or furthermore from two to three cycles, is acceptable. The conditioning treatment results in forming a stable coated film including some of the components within an electrolytic solution on a surface of particles of the silicon monoxide powder.

The thus obtainable silicon-containing material according to the present invention preferably has such a fundamental composition as $SiO_n$ (where 0.5≤"n"≤3), because Si atoms are pulled off from the disproportionated silicon monoxide, one of the raw materials, by the above-mentioned specific charging/discharging operation so that O atoms tend to increase. Since the silicon-containing material according to the present invention is able to sorb and desorb lithium therein and therefrom, including lithium in the fundamental composition is also acceptable, so that the present silicon-containing material is even expressible by such a compositional formula as $Li_mSiO_n$ (where 0≤"m"≤4.4, and 0.5≤"n"≤3).

When the silicon-containing material according to the present invention has a powdery shape, forming a conductive coated layer onto a surface of silicon-containing particles constituting the powder is also allowable. Forming a coated layer in advance onto a surface of particles of a raw-material powder is even permissible, or forming a coated layer after disproportionating a raw-material powder is also allowable. Alternatively, carrying out the formation of a coated layer simultaneously with the disproportionation of a raw-material powder by heating is even permissible.

So far, the modes for embodying the silicon-containing material according to the present invention have been described. However, the present invention is not an invention which is limited to the aforementioned embodying modes. The present invention is executable in various modes, to which changes or modifications that one of ordinary skill in the art carries out are made, within a range not departing from the gist of the present invention.

EMBODIMENT

The present invention is hereinafter described concretely, while giving an embodiment of the silicon-containing material according to the present invention.

Disproportionation Treatment

A heat treatment was carried out to silicon monoxide (e.g., an SiO powder of which average particle diameter was 5 μm, a product of SIGMA ALDRICH JAPAN Co., Ltd.) at from 800 to 1,200° C. within an inert atmosphere for from one to five hours, thereby disproportionating the SiO powder.

Silicon-Containing Material According to Embodiment

In order to obtain a silicon-containing powder according to Embodiment, a secondary battery was manufactured by the following procedures, thereby carrying out lithium sorbing and desorbing operations to the disproportionated SiO powder.

The following were mixed one another, and then a solvent was added to the resulting mixture to obtain a slurry-like mixture: the disproportionated SiO powder (being hereinafter set forth simply as the "SiO powder") and homogenous graphite (or SMG), the two serving as a negative-electrode active material; KETJENBLACK (or KB) serving as a conductive additive; and a polyamide-imide-resin/silica hybrid (e.g., "AI-Si") and a high-molecular-weight polyamide-imide (e.g., "AI-301"), the two serving as a binding agent. The used solvent was N-methyl-2-pyrrolidone (or NMP). A mass ratio between the SiO powder, SMG, KB, "AI-Si," and "AI-301" was SiO Powder/SMG/KB/"AI-Si"/"AI-301"=42/40/3/7.5/7.5 by percentage.

The aforementioned polyamide-imide resin/silica hybrid had a product name, "COMPOCERAN H900" (produced by ARAKAWA CHEMICAL INDUSTRIES, LTD.), and was made by bonding alkoxysilyl groups to a polyamide-imide resin.

Next, the slurry-like mixture was coated onto one of the opposite faces of a copper foil, a current collector, using a doctor blade, thereby turning the mixture into a film. The post-film-formation current collector was pressed by a predetermined pressure, was then heated at 200° C. for two hours, and was eventually left to cool. Thus, a negative electrode comprising a negative-electrode active-material layer fixated on a surface of the current collector was formed.

Next, the following were mixed one another, and were then turned into a slurry: a composite oxide (e.g., $LiNi_{1/3}CO_{1/3}Mn_{1/3}O_2$) serving as a positive-electrode active material; polyvinylidene fluoride (or PVdF) serving as a binding agent; and acetylene black (or AB) serving as a conductive additive. A mass ratio between the composite oxide, PVdF, and AB was Composite Oxide/PVdF/AB=88/6/6 by percentage. The resulting slurry was coated onto one of the opposite faces of an aluminum foil serving as a current collector, was then pressed, and was eventually calcined. Thus, a positive electrode comprising a positive-electrode active-material layer fixated on a surface of the current collector was obtained.

A polypropylene porous membrane serving as a separator was held in place between the positive electrode and the negative electrode. The resulting electrode assembly comprising the positive electrode, separator and negative electrode was laminated in a quantity of a plurality of pieces. Two pieces of aluminum films were made into a bag-shaped pouch by doing heat welding to the aluminum films at the circumference except for one of the sides. The electrode assemblies being laminated one after another were put into the pouched aluminum films, and an electrolytic solution was further put thereinto. While doing vacuum suctioning, the pouched aluminum films were thereafter sealed completely airtightly at the opening side. On this occasion, the positive-electrode-side and negative-electrode-side leading ends of the current collectors were protruded from the marginal ends of the films, thereby making the leading ends connectable to external terminals. Thus, a laminated-type secondary battery was obtained.

Note that two types of the electrolytic solution were readied. One of the electrolytic solutions labeled "Electrolytic Solution I" was an electrolytic solution in which $LiPF_6$ was dissolved in a concentration of 1.0 mol/L in a mixed solvent in which ethylene carbonate, ethyl methyl carbonate and dimethyl carbonate had been mixed one another in a volumetric ratio of 3:3:4. The other one of the electrolytic solutions labeled "Electrolytic Solution II" was an electrolytic solution in which $LiPF_6$ was dissolved in a concentration of 1.0 mol/L in a mixed solvent in which fluoroethylene carbonate, ethyl methyl carbonate and dimethyl carbonate had been mixed one another in a volumetric ratio of 3:3:4. Altering the types of the electrolytic solution led to obtaining two types of the laminated-type secondary battery in which the electrolytic solutions were distinct from one another. The laminated-type secondary battery including "Electrolytic Solution I" was labeled "Battery 01," whereas the laminated-type secondary battery including "Electrolytic Solution II" was labeled "Battery 02."

Next, a charging/discharging operation was carried out to the laminated-type secondary batteries, thereby carrying out lithium sorbing and desorbing operations to the SiO powder. Conditions of the charging/discharging operation were set as described below. Note that the abbreviations, "CC" and "CV," specify "constant current" and "constant voltage," respectively.

A first process comprised the following sub-processes done at 25° C.: CC charging up to 4.1 V with 0.2C; CC discharging down to 3.0 V with 0.2C; CC charging up to 4.1 V with 0.2C; CV charging at 4.1 V and keeping the CV charging for 90 minutes; CC discharging down to 3.0 V with 0.1C; CC charging up to 4.2 V with 1.0C; and CV charging at 4.2 V and keeping the CV charging for 90 minutes.

A second process comprised the following sub-processes done at 55° C.: CC discharging down to 4.0 V with 2C; CV discharging at 4.0 V and keeping the CV discharging for 20 minutes; CC charging up to 4.2 V with 2C; and CV charging at 4.2 V and keeping the CV charging for 20 minutes.

First of all, the first process, an ordinary conditioning treatment, was carried out. Thereafter, the second process was carried out repeatedly 15 times, thereby obtaining a secondary battery equipped with a negative electrode including the silicon-containing material according to Embodiment.

Silicon-Containing Material According to Comparative Example

Except that only the first process, an ordinary conditioning treatment, was carried out but the second process was not carried out at all, a secondary battery equipped with a negative electrode including the silicon-containing material according to Comparative Example was obtained by the same procedures as the above procedures according to Embodiment. The laminated-type secondary battery including "Electrolytic Solution I" was labeled "Battery C1," whereas the laminated-type secondary battery including "Electrolytic Solution II" was labeled "Battery C2."

Measurement of Complex Impedance

The respective secondary batteries were evaluated for the performance using the reactive resistance. The respective secondary batteries, which had undergone CC charging up to 4.2 V with 1C at 25° C., were subjected to a complex-impedance measurement at room temperature. For the measurement, a type-1255B frequency-responsive analyzer (or FRA) produced by SOLARTRON Corporation was used. Conditions of the measurement were set as follows: 4.2 V-DC bias; 10-mA amplitude; and from 0.05 to $1\times10^{-6}$-Hz frequency. Table 1 gives the reactive resistances of the secondary batteries obtained by the complex-impedance measurement.

TABLE 1

| Battery | Condition under which Silicon Oxide Material Sorbed and Desorbed Li | Type of Electrolytic Solution | Reactive Resistance ($\Omega$) |
|---|---|---|---|
| C1 | First Process | I | 0.97 |
| 01 | First Process Plus 15-time Second Process | I | 0.47 |
| C2 | First Process | II | 0.88 |
| 02 | First Process Plus 15-time Second Process | II | 0.38 |

Structural Analysis of Silicon-Containing Material

A structural analysis of the silicon-containing materials included in the negative electrodes of Battery 01 and Battery C1 was carried out. After subjecting each of the batteries having undergone the complex-impedance measurement to CC discharging down to 3.0 V with 1C at 25° C., the silicon-containing material was taken out. To be concrete, the negative electrode was washed with dimethyl carbonate (or DMC) after disassembling each of the post-discharging batteries, and then the negative-electrode active-material layer was peeled off from the current collector to remove therefrom. The peeled-off negative-electrode active-material layer was processed to a flaky shape with a thickness of 80 nm or less by argon-beam processing, thereby obtaining an observation sample. Therefore, the resulting silicon-containing material to be observed was put in a state where an amount of included lithium was decreased less than the amount in the post-complex-impedance-measurement silicon-containing material, namely, the post-4.2-V-charging silicon-containing material. Note that, although the resultant observation samples also included SMG, and so on, other than the silicon-containing materials, the observation samples were evaluated by irradiating the silicon-containing materials alone with an electron beam by a later-described apparatus.

Figure 2:
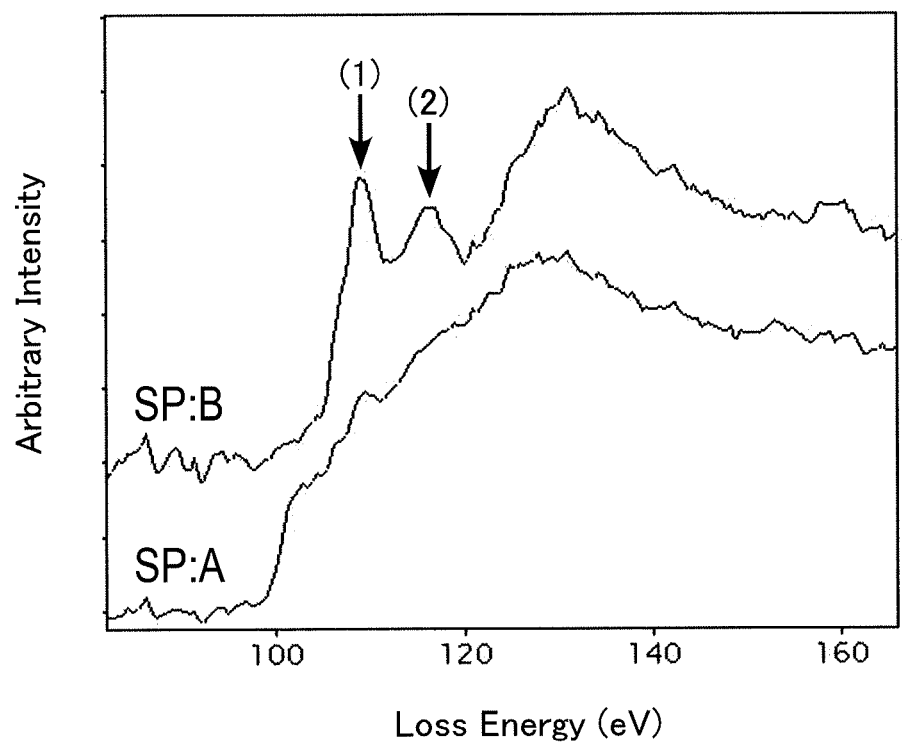
FIG. 2 is an inner-shell excitation energy-loss spectra of silicon measured by an electron energy-loss spectroscopic (or EELS) detector, and shows an energy-loss near-edge structure (or ELNES) thereof.
Figure 3:
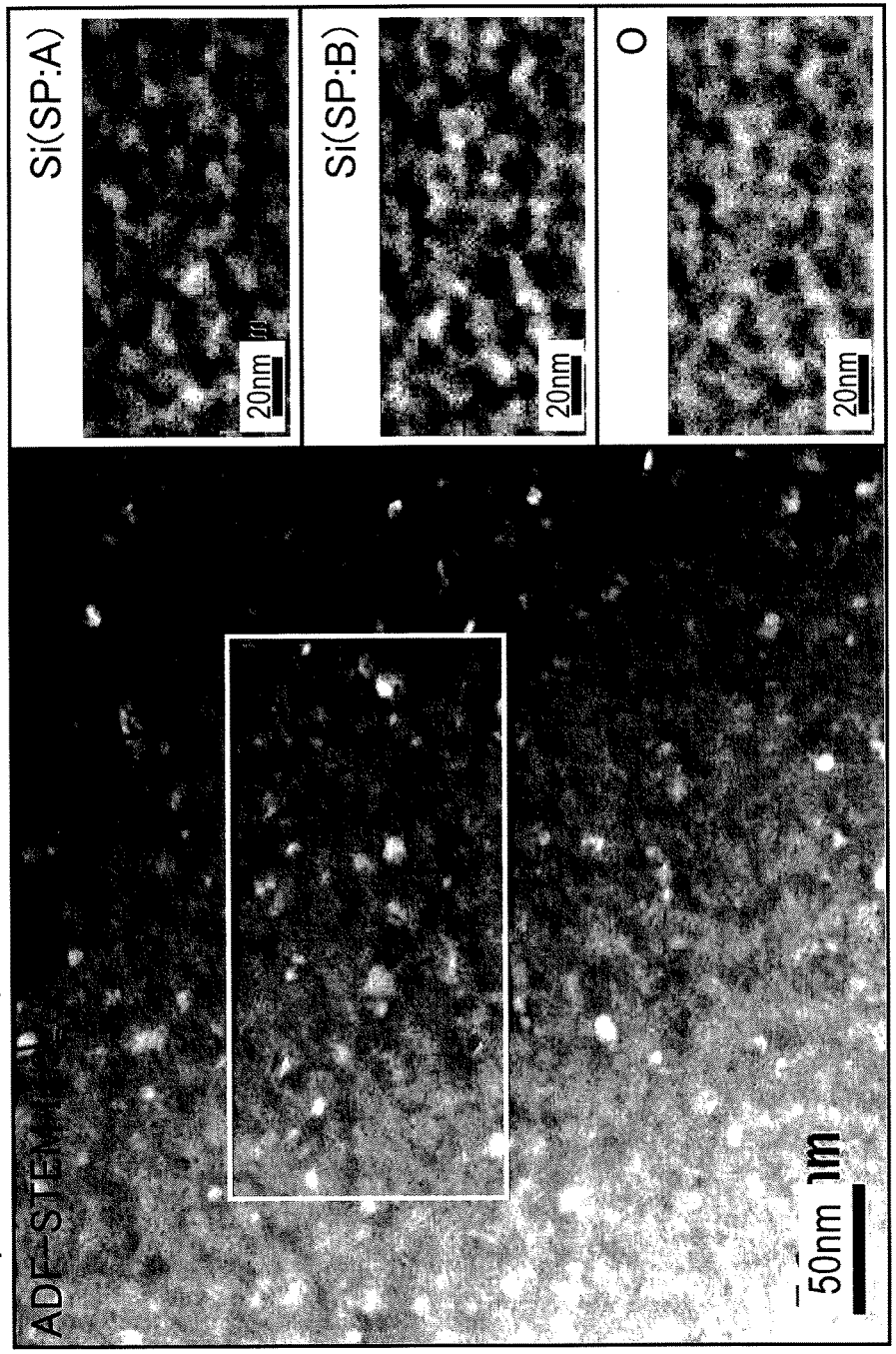
FIG. 3 is an ADF-STEM image of a conventional silicon-containing material (i.e., the left diagram), and EELS maps of an area surrounded with a frame on the ADF-STEM image (i.e., the top right, middle right and bottom right diagrams), EELS maps which show an intensity distribution of silicon representing a spectral profile "A" illustrated in FIG. 2, another intensity distribution of silicon representing a spectral profile "B" illustrated in FIG. 2 and an intensity distribution of oxygen, respectively, in sequence from the top to the bottom.

For the structural analysis, an apparatus, in which an electron-energy loss light (or EELS) detector was attached to an electric-field-emission type transmission electron microscope (or FE-TEM (e.g., "JEM-2100F" produced by NIHON DENSHI Co., Ltd.)), was used to examine the silicon-containing materials' internal texture and chemical state. As to the internal texture, the resulting annular dark-field scanning transmission electron microscope image (or ADF-STEM image) and EELS map were used to evaluate. As to the chemical state, the inner-shell excitation loss spectra of silicon and oxygen were measured mainly, thereby making an evaluation from the resultant energy-loss near-edge structures (or ELNES). FIG. 1 through FIG. 3 show the outcomes.

FIG. 1 is the result of observing the internal texture of the silicon-containing material according to Embodiment. In the ADF-STEM image, a continuous net-shaped texture extending as a whole was observed. Moreover, EELS maps shown on the right side to the ADF-STEM image are diagrams (or intensity distributions) mapping accumulated intensities in energy bands corresponding to the loss edges of silicon and oxygen, respectively. In an EELS map, parts appearing brightly (or whitely) are parts with strong intensities, the darker the parts become the more the intensities decline. The EELS maps designated as Si(SP:A) and Si(SP:B) correspond to ELNES profiles shown in FIG. 2. Both of the spectral profile "A" (or SP:A) and spectral profile "B" (or SP:B) were Si-derived signals appearing in the vicinity where the loss energy was 100 eV. The SP:A-designated spectrum was a broad Si—Si bond-derived spectrum. The SP:B-designated spectrum was an Si—O bond-derived spectrum having characteristic peaks at locations designated with (1) and (2) in FIG. 2. That is, the EELS maps designated as Si(SP:A) and Si(SP:B) show Si—Si bond-derived and Si—O bond-derived components found from secondary differentials of the spectra for every one of the pixels, respectively.

Since the "SP:A"-designated intensity distribution (the top right in FIG. 1) corresponds to the net-shaped white parts observed in the ADF-STEM image, Si with Si—Si bonds was found to exist abundantly in the net-shaped parts. Since the "SP:B"-designated intensity distribution (the middle right in FIG. 1) corresponds to the black parts inside the meshes observed in the ADF-STEM image, Si with Si—O bonds was found to exist abundantly within the meshed areas. The latter result was also supported by the fact that the intensity distribution of oxygen shown in the bottom right in FIG. 1 existed abundantly within the meshed areas. Note that the intensity of oxygen was estimated from a spectrum appearing in the vicinity where the loss energy was 530 eV.

From the above-described results, the silicon-containing material according to the Embodiment included in the observation sample was found to include a continuous phase including Si with Si—Si bonds, and a dispersion phase including Si with Si—O bonds and buried in an area demarcated by the net-shaped continuous phase. In short, the continuous phase was found to have silicon as a major component, and the dispersion phase was found to have silicon oxide as a major component. Note that, since the silicon-containing material included in the observation sample sorbed and desorbed lithium therein and therefrom repeatedly, the occurrence of such a possibility that lithium was included not only in the continuous layer but also in the dispersion phase is needless to be mentioned herein.

Next, particle diameters of individual fine particles constituting the dispersion phase, and a thickness of the continuous phase were measured from the EELS map on Si—O bond (middle right in FIG. 1) and the EELS maps on Si—Si bond (top right in FIG. 1). An average particle diameter of the dispersion phase was 15 nm, and the thickness of the continuous phase was 3 nm. Note that an average value of a plurality of particles' maximum diameters (i.e., the maximum values of intervals between two parallel lines when the particles were held between the parallel lines) measured from the former EELS map was regarded as the average particle diameter. An average value of thickness values measured at plurality of locations in the latter EELS map was regarded as the silicon continuous phase's thickness.

FIG. 3 is the result of observing the internal texture of the silicon-containing material according to Comparative Example. The silicon inner-shell excitation spectra were substantially identical with the spectra illustrated in FIG. 2. In the ADF-STEM image, particle-shaped spots dispersed as a whole to exist in a quantity of a plurality of pieces were observed whitely. In the "SP:A"-designated EELS map (top right in FIG. 3), an intensity distribution is observed intensely in such a configuration that corresponds to the white spots observed in the ADF-STEM image, so that Si with Si—Si bonds was found to exist abundantly at the parts of the spots. In the "SP:B"-designated EELS map (middle right in FIG. 3), since intensities of parts corresponding to the white spots observed in the ADF-STEM image are weak, and since high-intensity parts are observed so as to bury parts excepting the spots, Si with Si—O bonds were found to exist abundantly at the parts other than the spots. The result was also supported by the fact that the intensity distribution of oxygen shown in the bottom right in FIG. 3 existed abundantly at the parts other than the spots.

From the above-described results, the silicon-containing material according to Comparative Example was found to include an oxide phase including silicon oxide-based compounds with Si—O bonds, and silicon fine particles dispersed in the oxide phase.

Figure 4:
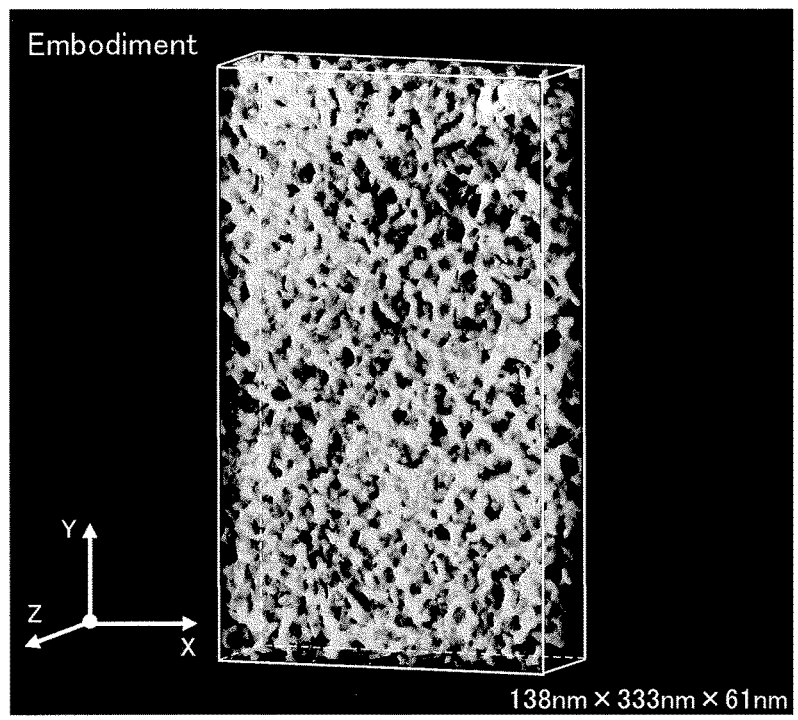
FIG. 4 illustrates a three-dimensionally reconstructed image of the silicon-containing material according to the present invention taken by electron-beam tomography.

Next, a nanometer-size structure of the silicon-containing material according to Embodiment was observed three-dimensionally by electron-beam tomography using FE-TEM. A used observation sample was the above-mentioned flake-shaped observation sample to which a gold colloid for positioning was adhered. While inclining the observation sample slightly within the TEM, an ADF-STEM image was photographed a plurality of times. From a plurality of shots of the resulting ADF-STEM image, a three-dimensional image of the observation sample was reconstructed on a computer screen in accordance with the "Radon-Inverse Radon" theorem giving the basic principle of computer-aided tomographic photographing (or CT). Note that the conditions of photographing were set as follows: 250,000-time magnification; and an inclination angle of from −60 deg. to +60 deg. (calibrated at intervals of 2 deg.). FIG. 4 shows a diagram of the resultant three-dimensionally reconstructed image. Moreover, FIG. 5 and FIG. 6 are cross-sectional diagrams of the three-dimensionally reconstructed image shown in FIG. 4, and show the "X"-"Y" cross section and the "Z"-"X" cross section, respectively.

Figure 5:
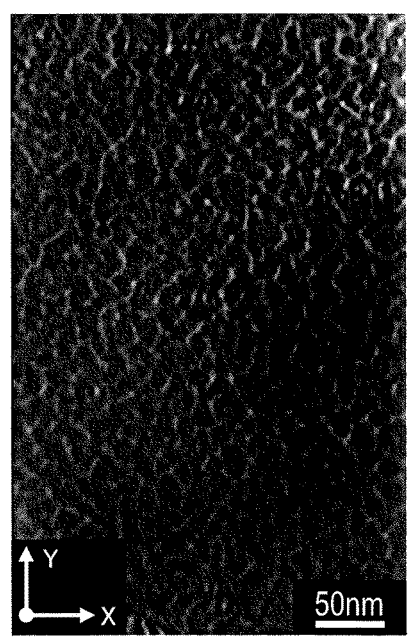
FIG. 5 is an "X"-"Y" cross-sectional diagram of the three-dimensionally reconstructed image illustrated in FIG. 4.
Figure 6:
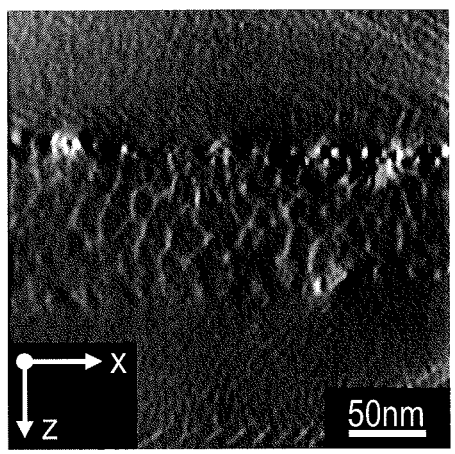
FIG. 6 is a "Z"-"X" cross-sectional diagram of the three-dimensionally reconstructed image illustrated in FIG. 4.

In FIG. 4 through FIG. 6, parts observed whitely correspond to the parts where silicon with Si—Si bonds existed abundantly. In FIG. 4 through FIG. 6, parts observed blackly correspond to the parts where silicon with Si—O bonds existed abundantly. In short, the continuous phase was ascertained to exist so as to be continuous three-dimensionally around the particles which had 15 nm approximately in size and constituted the dispersion phase. Since the continuous phase covered a surface of the individual particles constituting the dispersion phase to exist continuously, the continuous phase was said to have a bubble-shaped skeleton.

The reactive resistances shown in Table 1 were the entire secondary batteries' resistance against electrochemical reactions; the smaller the value is the more desirable the value is for a battery to operate. When comparing Battery 01 with Battery C1, the reactive resistance of Battery 01 was about a halved value of the reactive resistance of Battery C1. The difference between the two was relevant only to the difference between the fine structures of the silicon-containing materials included in the negative electrodes. In short, Battery 01, which used as a negative-electrode active material the silicon-containing material according to the present invention comprising a continuous phase possessing a three-dimensionally continuous bubble-shaped skeleton and including silicon with Si—Si bond as a major component, was found to be superior to Battery C1, which used as a negative-electrode active material the silicon-containing material according to Comparative Example comprising silicon fine particles scattering about within a mother phase having silicon oxide as a major component.

Moreover, when comparing Battery 02 with Battery C2, Battery 02, which used as a negative-electrode active material the silicon-containing material according to the present invention comprising a continuous phase possessing a three-dimensionally continuous bubble-shaped skeleton and including silicon with Si—Si bond as a major component, was found to be superior to Battery C2, which used as a negative-electrode active material the silicon-containing material according to Comparative Example comprising silicon fine particles scattering about within a mother phase having silicon oxide as a major component.

In short, using as a negative-electrode active material the silicon-containing material according to the present invention comprising a continuous layer, which includes silicon with Si—Si bond as a major component and possesses a three-dimensionally continuous bubble-shaped skeleton, was found to result in making a secondary battery with a low reactive resistance obtainable, regardless of the types of the electrolytic solution.

The invention claimed is:

1. A silicon-containing material being obtained by a production process including a charging/discharging process in a set of two cycles or more wherein cation sorbing and desorbing are carried out to disproportionated silicon monoxide with a constant current and/or at a constant voltage with a C rate of from 1C or more to 4C or less and within a voltage range of from 3.6 V to 4.2 V at a temperature of from 35° C. or more to 80° C. or less, the silicon-containing material including at least:
   a continuous phase including silicon with Si—Si bond, and possessing a bubble-shaped skeleton being continuous three-dimensionally; and
   a dispersion phase including silicon with Si—O bond, and involved in an area demarcated by said continuous phase to be in a dispersed state.

2. The silicon-containing material as set forth in claim 1, where said production process includes said charging/discharging process in a set of from 10 to 20 cycles.

3. The silicon-containing material as set forth in claim 1, wherein
   said continuous phase includes one or more members selected from the group consisting of elementary-substance silicon, and silicon-based compounds,
   said dispersion phase includes a silicon oxide-based compound.

4. The silicon-containing material as set forth in claim 3, wherein
   said silicon-based compounds include an Si—Li compound,
   said silicon oxide-based compound includes one or more members selected from the group comprising Si—O compounds, and Li—Si—O compounds.

5. The silicon-containing material as set forth in claim 4, wherein
   said Si—O compounds include one or more members selected from the group consisting of $SiO_2$, and $SiO_x$ (where "x" falls in a range of $0.5 \leq "x" \leq 1.5$),
   said Li—Si—O compounds include one or more members selected from the group consisting of $Li_2SiO_3$, $Li_4SiO_4$, $Li_2Si_2O_5$, $Li_6Si_2O_7$, $Li_2Si_3O_7$, and $Li_8SiO_6$.

6. The silicon-containing material as set forth in claim 1, wherein
   said continuous phase includes an elementary substance of silicon,
   said dispersion phase includes a silicon oxide.

7. The silicon-containing material as set forth in claim 1 comprising a powder including silicon-containing particles including said continuous phase and said dispersion phase.

8. The silicon-containing material as set forth in claim 1, wherein
   said dispersion phase is composed of a plurality of fine particles retained in said area demarcated by said continuous phase,
   the fine particles have an average particle diameter of from 0.05 to 50 nm.

9. The silicon-containing material as set forth in claim 1 being able to sorb and desorb lithium therein and therefrom, and having $SiO_n$ (where $0.5 \leq "n" \leq 3$) as a fundamental composition.

10. An active material for secondary battery, the active material including the silicon-containing material as set forth in claim 1.

11. A negative electrode for secondary battery, the negative electrode including the active material for secondary battery as set forth in claim 10.

12. A secondary battery comprising:
   a positive electrode;
   the negative electrode as set forth in claim 11; and
   a nonaqueous-system electrolytic solution.

* * * * *